March 30, 1937.  G. R. BAKER  2,075,012
APPARATUS FOR FEEDING BISCUITS OR THE LIKE
TO OVENS, PANS, CONVEYERS, OR THE LIKE
Filed Nov. 7, 1932   10 Sheets-Sheet 1
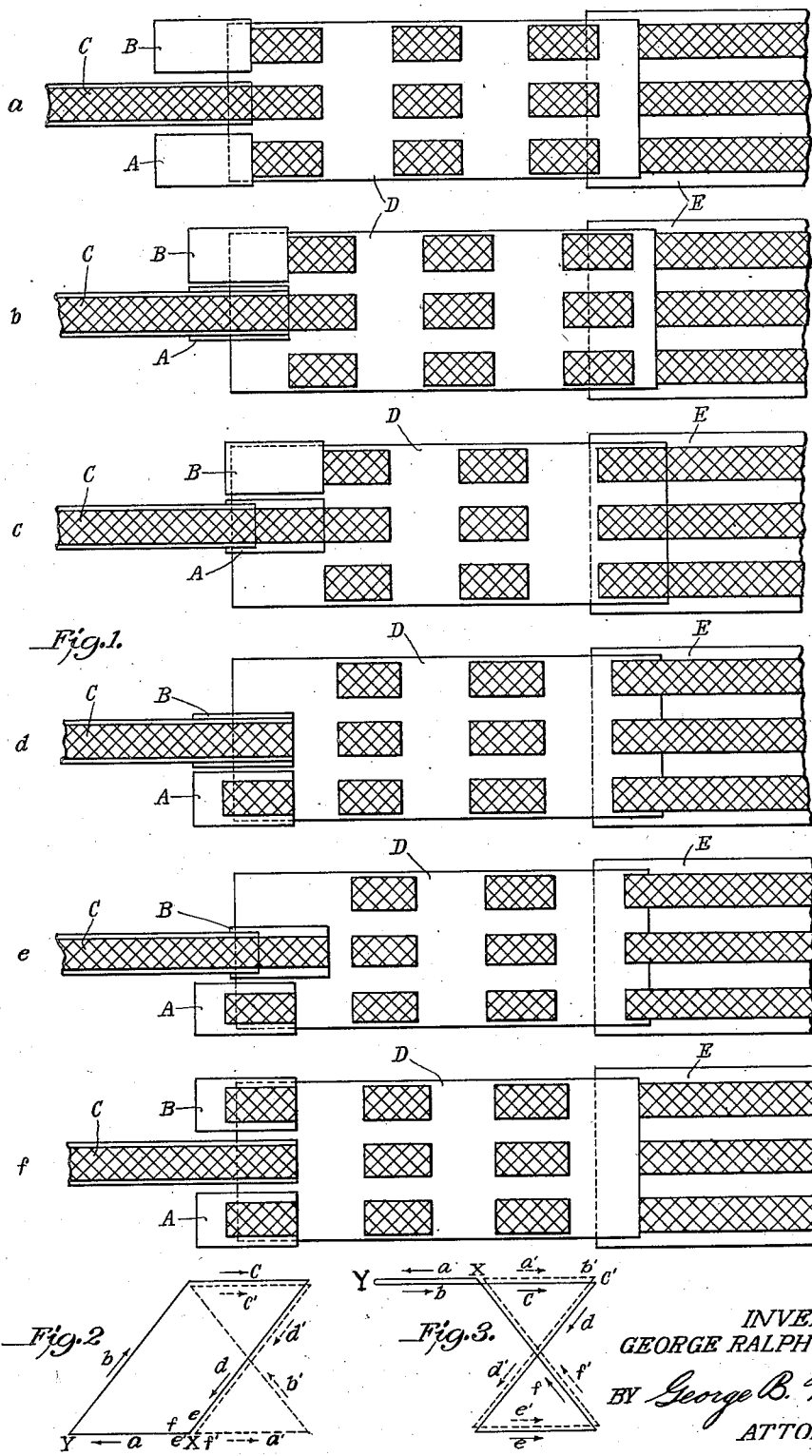
INVENTOR
GEORGE RALPH BAKER
BY George B. Willcox
ATTORNEY

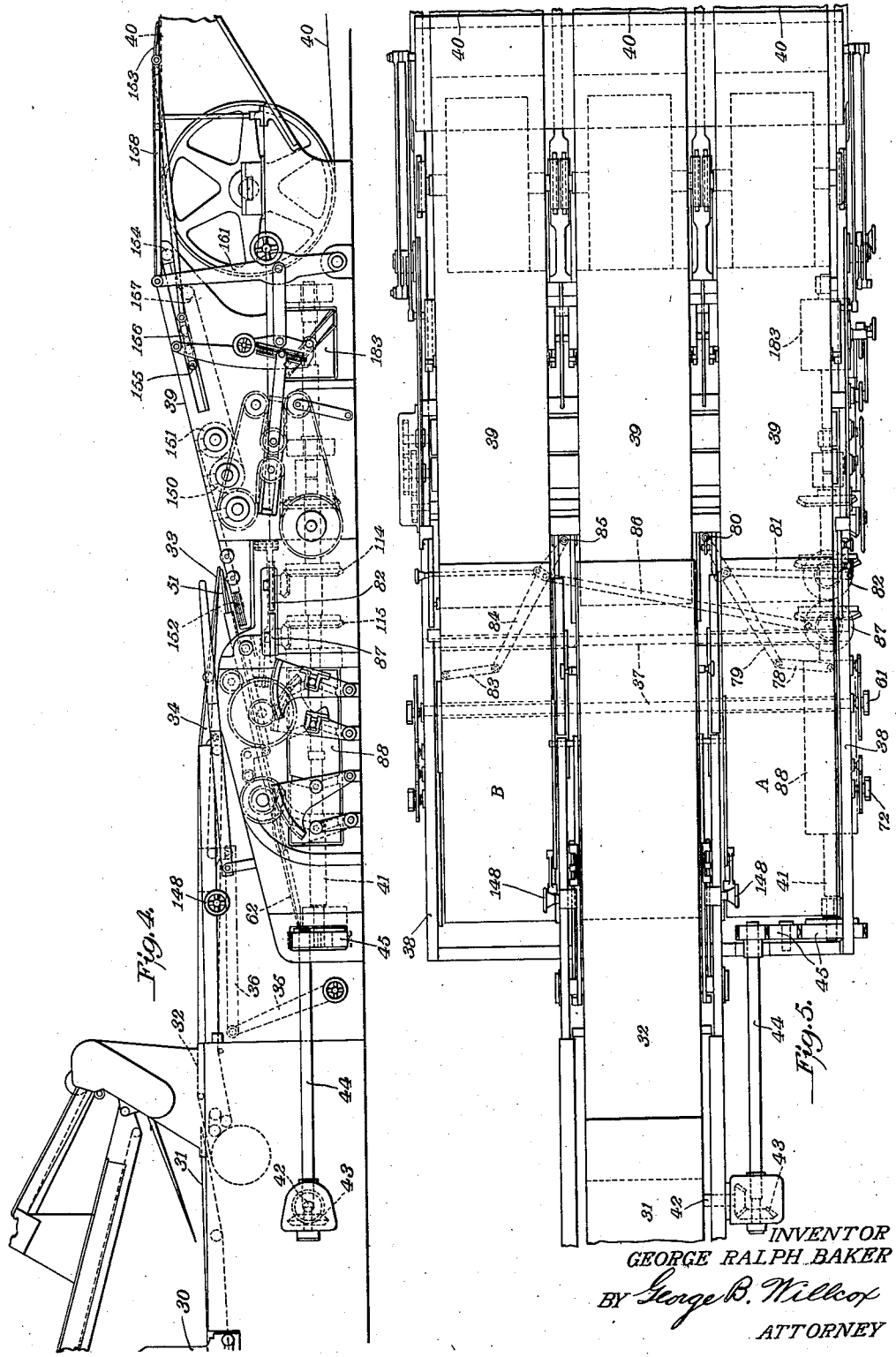

Inventor
GEORGE RALPH BAKER

By Geo. B. Willcox
Attorney

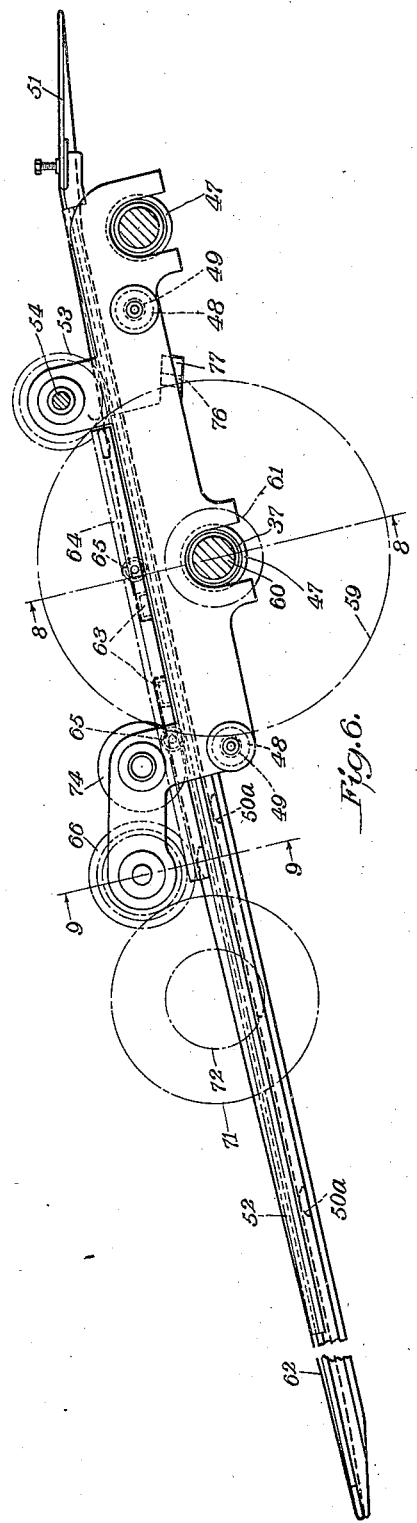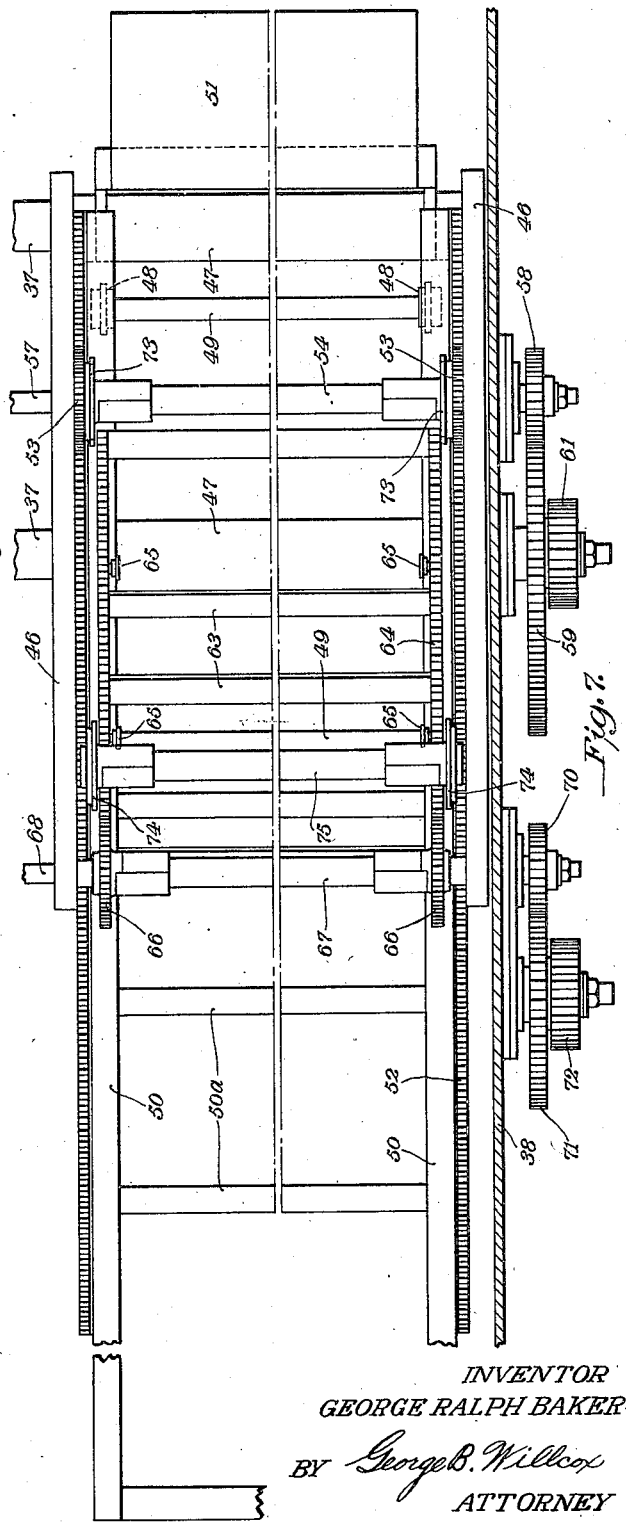

INVENTOR
GEORGE RALPH BAKER
Geo. B. Willcox
ATTORNEY

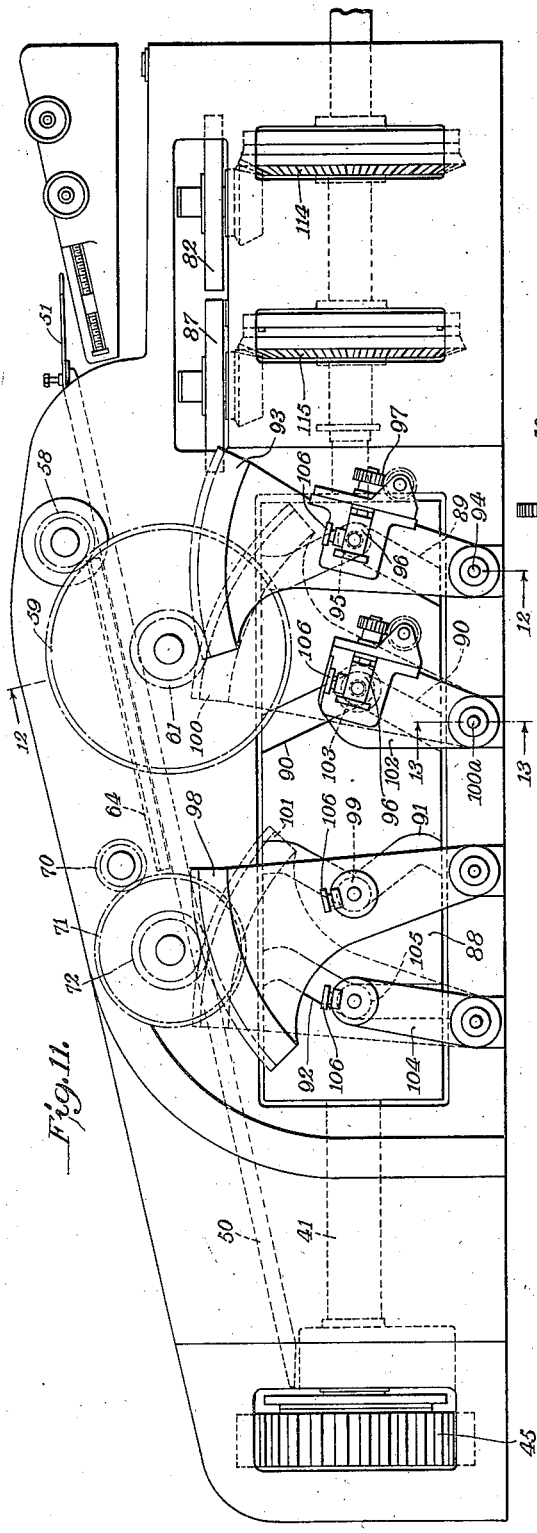

March 30, 1937.  G. R. BAKER  2,075,012
APPARATUS FOR FEEDING BISCUITS OR THE LIKE
TO OVENS, PANS, CONVEYERS, OR THE LIKE
Filed Nov. 7, 1932  10 Sheets-Sheet 7
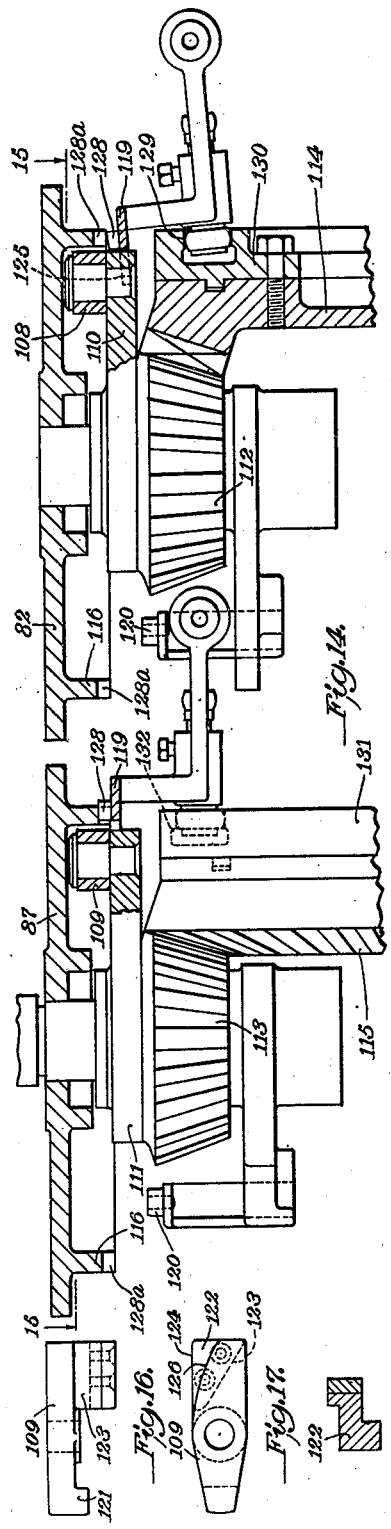
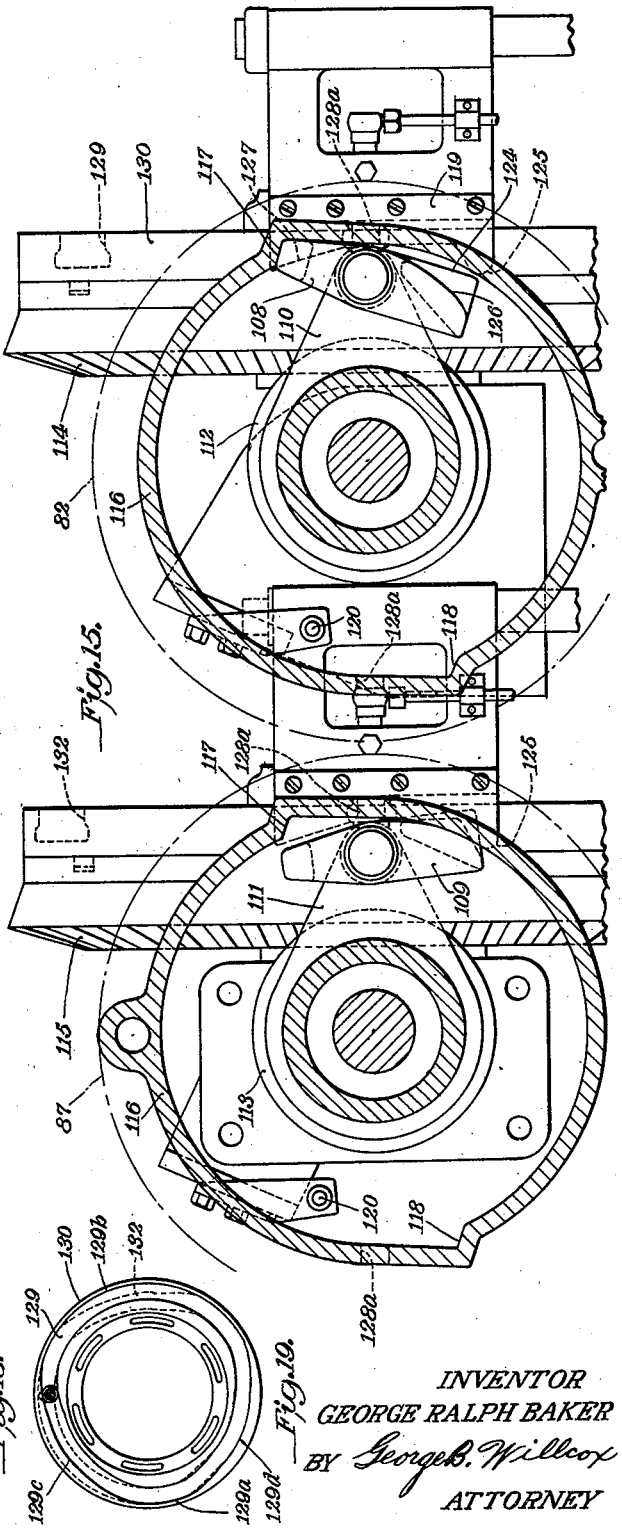
INVENTOR
GEORGE RALPH BAKER
BY George B. Willcox
ATTORNEY March 30, 1937.  G. R. BAKER  2,075,012
APPARATUS FOR FEEDING BISCUITS OR THE LIKE
TO OVENS, PANS, CONVEYERS, OR THE LIKE
Filed Nov. 7, 1932   10 Sheets-Sheet 8
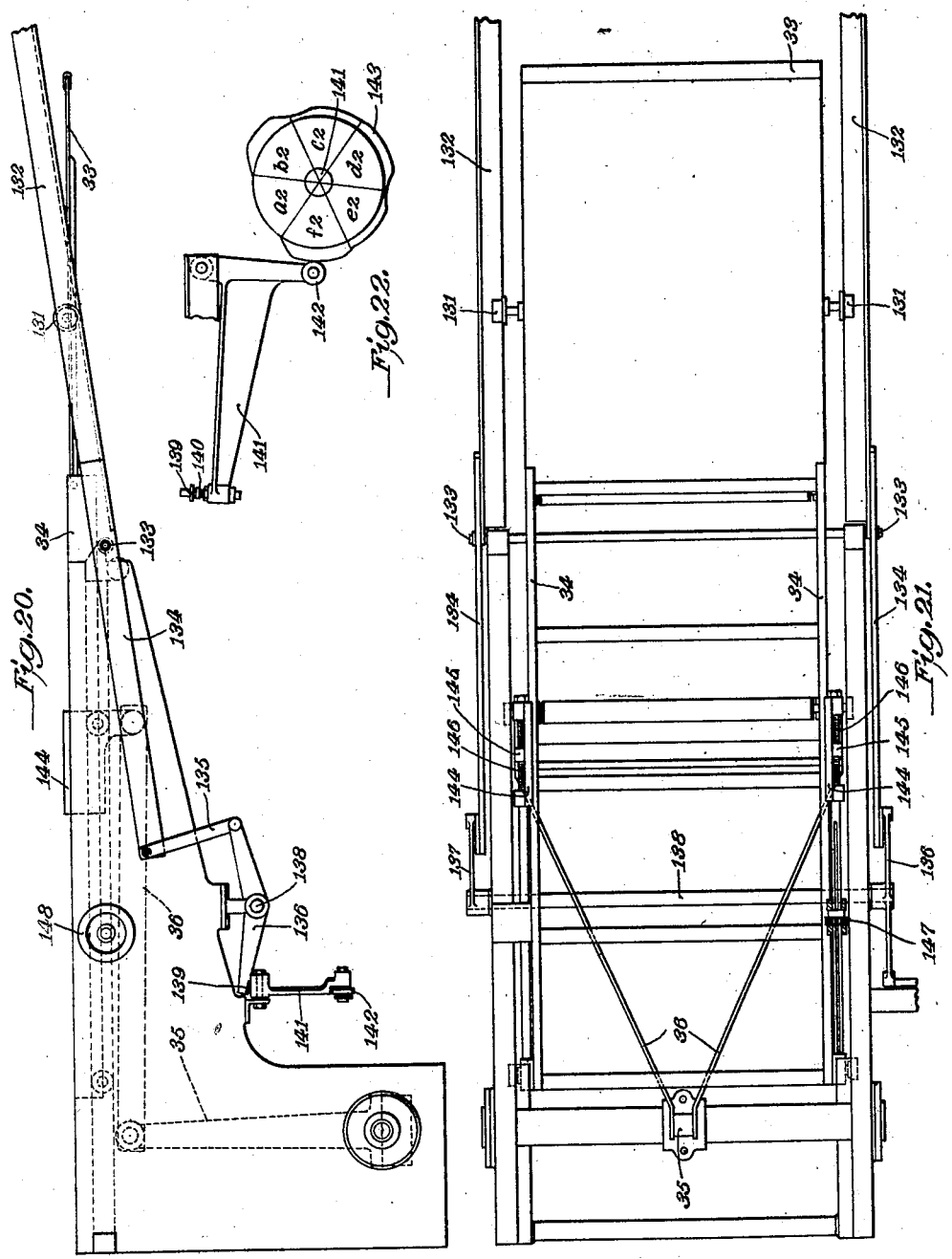
INVENTOR
GEORGE RALPH BAKER
BY George B. Willcox
ATTORNEY

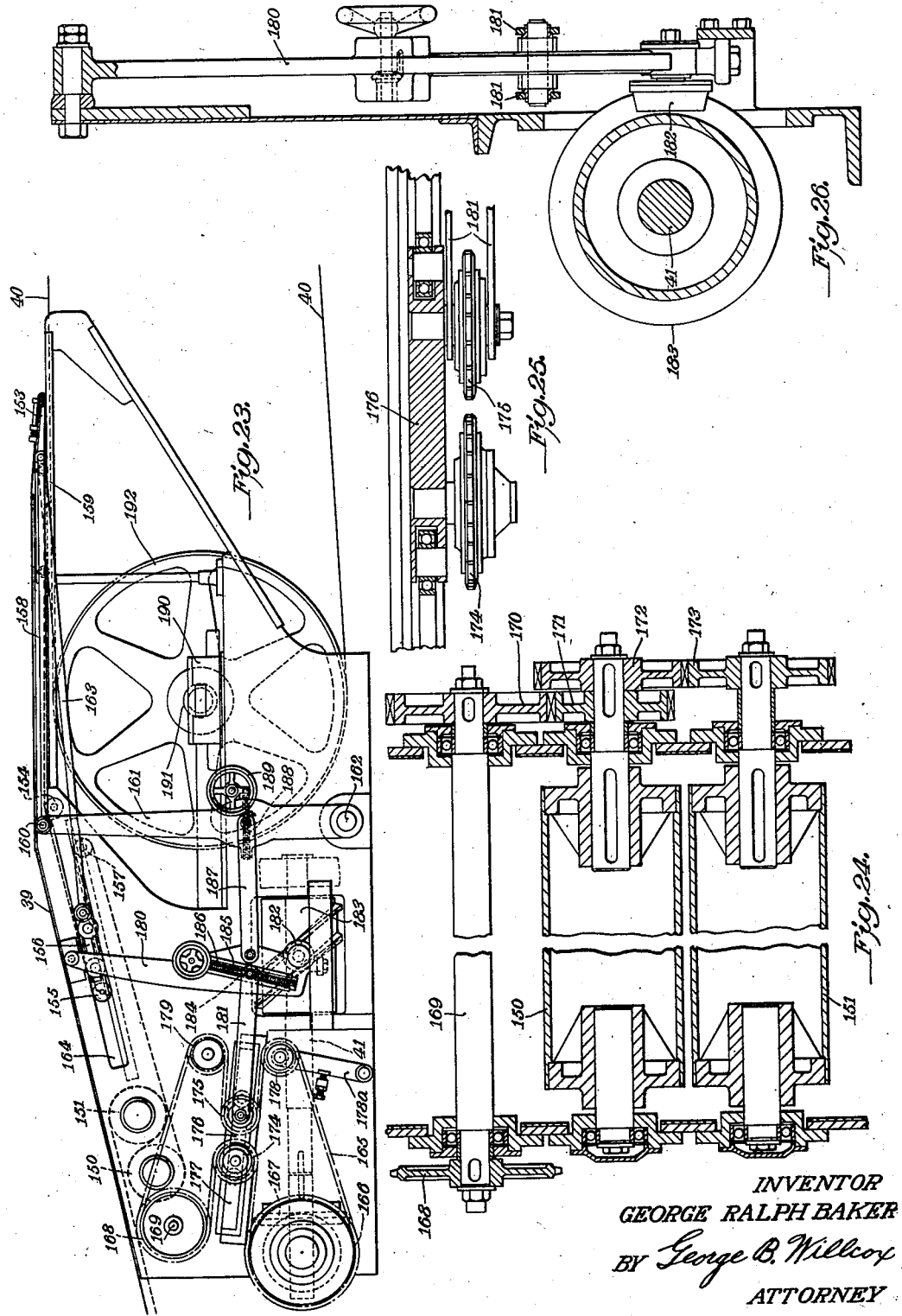

March 30, 1937. G. R. BAKER 2,075,012
APPARATUS FOR FEEDING BISCUITS OR THE LIKE
TO OVENS, PANS, CONVEYERS, OR THE LIKE
Filed Nov. 7, 1932 10 Sheets-Sheet 10

INVENTOR
GEORGE RALPH BAKER
BY George B. Willcox
ATTORNEY

Patented Mar. 30, 1937

2,075,012

UNITED STATES PATENT OFFICE 2,075,012

APPARATUS FOR FEEDING BISCUITS OR THE LIKE TO OVENS, PANS, CONVEYERS, OR THE LIKE

George Ralph Baker, Willesden, London, England, assignor to Baker Perkins Company, Inc., Saginaw, Mich., a corporation of New York Application November 7, 1932, Serial No. 641,501
In Great Britain November 11, 1931

9 Claims. (Cl. 107—7)

This invention relates to means for feeding dough shapes and like articles as supplied from a cutting or moulding machine or other continuously operating source, to oven pans, continuously traveling ovens, or like machinery for further treatment.

Although the invention is applicable to other than the bakery trade, for convenience hereinafter the invention will be described with reference thereto and the dough shapes or other articles will be referred to as "biscuits".

The invention, as will be observed, employs certain known mechanism for the transfer of biscuits consisting in endless traveling webs or conveyers operating over reciprocating panner blades in known manner.

Furthermore, although any known kind of continuously operating cutting or article-producing machine or supplying mechanism (referred to hereinafter as a "cutting machine") having in association a continuously traveling delivery conveyer band, may be employed, the preferred type of cutting machine referred to more particularly herein is such as has a reciprocating and oscillating head adapted to cut biscuits from a continuously traveling dough sheet and deliver the column of rows of cut biscuits in batches by the aid of a reciprocating panner blade over which a conveyer band travels.

The phrase "plurality of ovens" employed hereinafter is used and intended to include ovens arranged side by side or an oven having a plurality of conveyers arranged side by side, or single conveying means of a width adapted to accommodate a plurality of batches located side by side, or oven pans carried by a continuously traveling conveyer preparatory to their transfer to ovens. Furthermore, for convenience the description will be confined to the delivery to ovens of the traveling steel band type as distinct from the pan conveyer type and as distinct from the delivery to pans or trays carried by a separate conveyer and adapted to be transferred later to ovens.

Continuously traveling oven constructions of necessity operate at a somewhat slow rate determined by the baking conditions while cutting machines are capable of operating at a considerably greater rate and, hence, usually have to be run at a rate well below their maximum or, in other words, the modern cutting machine which is an expensive piece of machinery is capable of an output far in excess of the capacity of the oven which it is intended to supply. It will, therefore, be appreciated that there is wastage or lack of efficiency on the cutting machine side in biscuit bakery plants.

An object of the present invention is to provide a continuously operating mechanical means for delivering the output of a cutting machine at a rate approaching its maximum output (or at a rate adapted to supply the requirements of a plurality of ovens) to a plurality of ovens. Thus an aim of the invention lies in simultaneously serving from a single cutting machine, a plurality of ovens or a wide oven of a lateral capacity which is a multiple of the width of the biscuit batch produced by the cutting machine.

The invention comprises a machine for feeding the biscuits from the conveyer band of a continuously operating cutting machine to a plurality of ovens, offsetting batches of biscuits from the line of delivery of the cutting machine conveyer and advancing the biscuits on a correspondingly wider front in the same direction for delivery to the oven conveyer or conveyers.

The invention also consists in assembling batches of biscuits abreast or in parallel for delivery to the ovens, upon a transfer conveyer (or conveyers) located between the cutting machine conveyer and the ovens and adapted to travel at differential rates corresponding with the movement of the cutting conveyer and the travel rate of the ovens.

The invention also comprises a shuttle element adapted to be displaced laterally, including a frame or support over which a conveyer band is capable of relative displacement longitudinally, together with the actuating mechanism therefor.

In the accompanying drawings:

Figure 1 diagrammatically illustrates the application of the invention to the delivery of batches of biscuits from a cutter panned to three oven bands, and employing two shuttle panners.

Figure 2 is a diagram illustrating the movements of one shuttle panner.

Figure 3 is a similar diagram illustrating the movements of the other shuttle panner.

Figure 4 is an elevation showing the general arrangement of a machine employing two shuttles.

Figure 5 is a plan view corresponding to Figure 4.

Figure 5a is a top plan view of the structure shown in Fig. 4a.

Figure 6 is an elevation of a shuttle panner.

Figure 7 is a plan corresponding to Figure 6.

Figure 10 is a diagram of a development of the cams for operating the shuttle frames or panning blades and their panning webs.

Figure 11 is an elevation showing the drive from the cams to the shuttles.

Figure 12 is a section of a detail (taken on the line 12—12 of Figure 11) of a toothed quadrant.

Figure 13 is a section on the line 13—13 of Figure 11.

Figure 14 is an elevation showing a crank disc drive for moving the shuttles into position beneath the cutter panner.

Figure 15 is a part section plan taken on the line 15—15 of Figure 14.

Figures 16, 17 and 18 are detail views of the driving pawl for operating the crank discs shown in Figure 14.

Figure 19 is a view showing the cams for controlling the pawl shown in Figures 16, 17 and 18.

Figure 20 is an elevation of a mechanism for controlling the vertical movements of the cutter panner.

Figure 21 is a corresponding plan to Figure 20.

Figure 22 is a detail view showing the cam for controlling the vertical movements of the cutter panner.

Figure 23 is an elevation of the mechanism for controlling the transfer conveyer.

Figures 24, 25 and 26 are details of the transfer conveyer mechanism.

Figure 29 is a diagrammatic view showing the operation of a single shuttle adapted to deliver two rows of biscuits to the oven, while

Figure 4A:
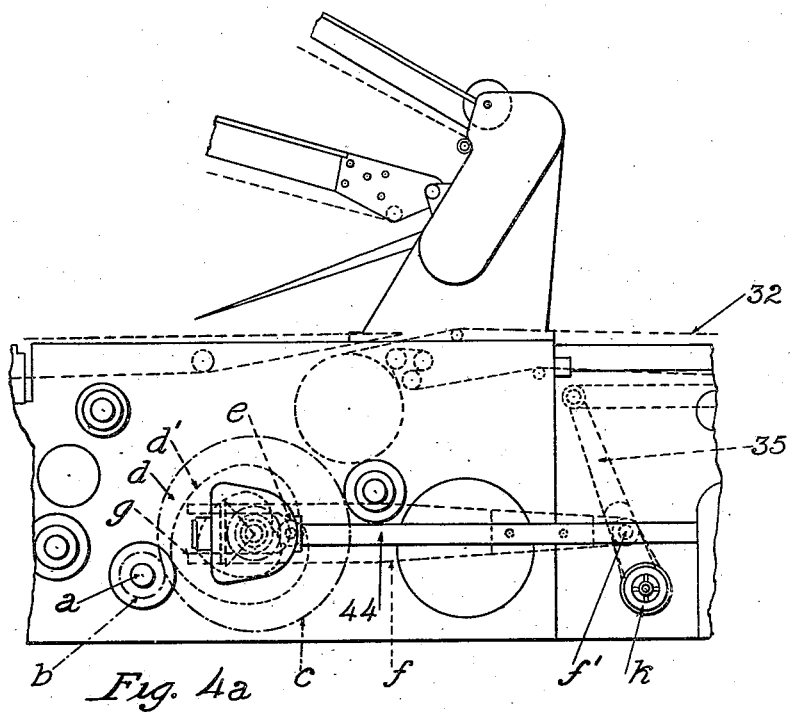
Figure 4a is an enlarged side elevation showing the driving connection between the shuttle mechanism and the cutter panner drive shaft.

In carrying the invention into effect according to one convenient mode (see Figure 1, in which the biscuits are represented by 'cross-hatching') and wherein the cutter panner is adapted to deliver batches of biscuits to three ovens, two shuttle panners A and B are provided which are adapted to receive alternately a batch of biscuits from the cutter panner C. As the cutter panner travels at three times the rate of the oven E the cycle of operations is conveniently divided into six parts corresponding to the three forward and return reciprocations of the cutter panner.

The diagrams a to f indicate the positions of the parts over a complete cycle.

The shuttle panners A and B are in turn moved beneath the cutter panner C and back again to their outer position with a batch of biscuits, after which the shuttles, together with the cutter panner simultaneously deliver three batches side by side onto a transfer or a differential conveyer D. The differential conveyer delivers the batches to the ovens E.

During the time the differential conveyer is receiving batches of biscuits from the cutter panner and shuttle panner, it is driven at a rate corresponding to the rate of travel of the conveyer of the cutter panner, while when the transfer conveyer pans onto the ovens E the rate of travel of such conveyer is slower to agree with the speed of travel of the ovens.

Diagram a, Figure 1, shows the position at the end of panning from the shuttles A and B and the cutter panner C onto the transfer conveyer D.

During the next sixth of a cycle, while the cutter panner is moving forwardly ready to pan, the shuttle A moves beneath the cutter panner and forwardly into a position to receive a batch of biscuits. During this movement of the shuttle panner A the shuttle B moves forwardly performing an idle stroke. The cutter panner then moves rearwardly to pan biscuits onto the shuttle A, as indicated in diagram c, while at the same time shuttle A moves forwardly, the panning action being divided between the two panners. While this action is occurring the shuttle B again moves forward on an idle stroke so as to lie in alignment with the shuttle A.

During the next sixth of the cycle the cutter panner C again moves forwardly to occupy a position to pan while the shuttle panner A with the batch of biscuits moves outwardly and rearwardly into a position so that its panning blade is in alignment with the forward position of the cutter panner knife ready to pan biscuits onto the transfer conveyer.

Meanwhile the shuttle B moves inward beneath the cutter panner C and rearwardly to a position to receive a batch of biscuits therefrom. This position of the parts is shown in diagram d.

The cutter panner then moves rearwardly to pan while the shuttle B moves forwardly to receive the batch as indicated in diagram e.

During this period the shuttle A with its batch of biscuits remains stationary.

The cutter panner C then moves forwardly into a position to pan direct to the transfer conveyer D and at the same time the shuttle B moves outwardly and rearwardly so that its blade is in alignment with the panner blades of the cutter panner and the shuttle A. The cutter panner and the shuttles are now all in a position to pan three batches side by side simultaneously onto the transfer conveyer D, as indicated in the diagram f.

The cycle is then repeated, the batches being panned onto the transfer conveyer as shown in diagram a.

It will be appreciated that during the cycle the shuttle belts or webs will at times move relatively to the shuttle panner blades, while at other times they will be stationary relatively to each other.

The diagrams in Figures 2 and 3 indicate the relative positions of the shuttle conveyers or webs and panning blades, the full lines indicating the movements of the panner blades, while the broken lines indicate the movements of the webs.

Thus, referring to Figure 2 which illustrates the movements of the web and panning blades of the shuttle A and starting from the point X, which corresponds to the position when the shuttle is about to pan onto the intermediate or transfer conveyers, (that is when the shuttle is in the position shown in diagram f of Figure 1) the panning is effected by the blade moving to the left while the web has a movement to the right, marked respectively a, a'. The shuttle is then moved inwardly and the panner blade moves to the right, as indicated by b; at the same time the web moves to the left, as indicated by b'. The shuttle is then in a position to receive a batch of biscuits.

During the next part of the cycle the web and blade move forwardly together, as indicated by c, c' to receive the batch of biscuits. The shuttle then moves outwardly and the web and blade move together, as indicated by d and d', the parts now being at the position d, Figure 1.

During the next third of the cycle, while the shuttle B is receiving its batch, the shuttle A remains stationary at the point X, as indicated by the letters f, f' in Figure 2.

The movements of the web and panning blade of the shuttle B are indicated in the diagram, Figure 3.

Starting from the point X where the shuttle is in a position to pan biscuits onto the transfer conveyer, corresponding to the position in diagram f, Figure 1, the panning blade moves rearwardly while the shuttle web moves forwardly as indicated by a and a' in Figure 3.

During the next sixth of the cycle the blade moves forwardly as indicated by b, while the web remains stationary, as indicated by b'. A further forward movement of the blade then occurs indicated by c, while the web still remains stationary, as indicated by c'. The shuttle B then moves inwardly under the cutter panner (corresponding to position d, Figure 1) to a position to receive a batch of biscuits. The blade and web now move forwardly together to receive the batch of biscuits, as indicated by d, d', after which the shuttle is moved outwardly, the blade and web moving together rearwardly to a position for panning onto the transfer conveyer D.

It will be appreciated that the web and panner blade of the shuttle B could follow a similar path to that of shuttle A, as indicated in the diagram, Figure 2, but it is found convenient to move shuttle B and its web and panner on the path as shown in Figure 3 for the purpose of shortening the length of the machine.

The transfer conveyer D may be of a suitable length to receive a plurality of series of laterally aligned batches, as indicated in the diagrams, Figure 1, which are spaced a batch length from one another and which are transferred to the ovens E to form continuous columns owing to the differential rate of travel of the transfer conveyer D.

It will be noted that the panning of the biscuits onto the ovens E is effected during the half of the cycle indicated by the references d, e, f, Figure 1 so that by the time the batches are panned onto the oven the shuttles A and B and the cutter panner are ready to pan three further batches onto the other end of the transfer conveyer.

Referring now to Figures 4 and 5 which illustrate the general arrangement of the machine operating according to the scheme set out in the diagrams, Figures 1 to 3, a biscuit cutting machine 30 of known form is provided which delivers biscuits to a conveyer 31 which in turn delivers to the cutting panner conveyer 32 having a reciprocating panner blade 33 pivotally mounted upon a carriage 34 and adapted to be reciprocated by an oscillating lever 35 which is coupled to the carriage by a link 36. The lever 35 is oscillated through a rotary cam (not shown) in known manner.

The shuttles A and B comprise frames which reciprocate laterally upon tubular members 37 extending between the frames 38 of the machine.

The transfer or differential conveyer comprises three bands 39 which are all driven from a common driving mechanism. These transfer bands deliver the batches of biscuits to three steel oven bands 40.

The shuttle mechanism and the differential transfer conveyer are driven from a common shaft 41 extending lengthwise of the machine which is driven from a shaft 42 through bevel gear 43, countershaft 44 and spur gearing 45.

Figure 5A:
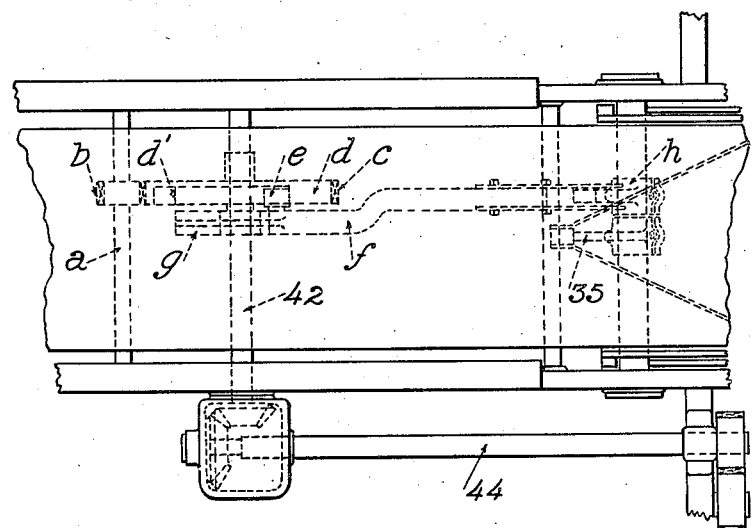

Referring to Figs. 4a and 5a, shaft 42 is driven from shaft a (of the drive mechanism for the cutter conveyer and its panner mechanism) through gears b and c, gear c being formed in the periphery of a cam disk d having a cam groove b', in which is engaged a cam follower e carried by a link f. Link f is forked at g and is supported thereby on the shaft 42 so that it is reciprocable relative to the shaft. At its other end link f is pivotally connected at f' to an arm 8 on the rock-shaft of lever 35. Adjustment of the length of the stroke imparted by lever 35 is effected by varying the distance of the pivot f' from the rock-shaft. This is done through hand wheel k which operates a screw and nut mechanism of known type.

Referring more particularly to Figures 6, 7, 8 and 9 which illustrate the construction of a shuttle panner, a pair of side frames 46 is provided which are connected by tubular spacing members 47 adapted to slide upon the tubes 37. The side frames are provided with rollers 48 carried upon spindles 49 and supporting side angle pieces or longitudinals 50 which form the shuttle frame and with which the panner blade 51 is connected.

The angles or longitudinals 50 are connected together at intervals by spacers or bars 50a. The longitudinals carry racks 52 in which pinions 53 mesh, such pinions being mounted upon a sleeve 54 provided with a key 55 engaging a groove 56 in a driving spindle 57.

The spindle extends through the framing 38 of the machine and carries a pinion 58 which meshes with a gear wheel 59 mounted upon a stub shaft 60 fixed in the end of the tube 37.

The gear wheel 59 has a pinion 61 keyed to its boss whereby the gear wheel may be driven as hereinafter referred to.

On rotation of the gear wheel 59 the splined shaft 57 is rotated and imparts movement to the pinion 53 and thus moves the shuttle frame 50, 50a longitudinally of the machine.

Figure 8:
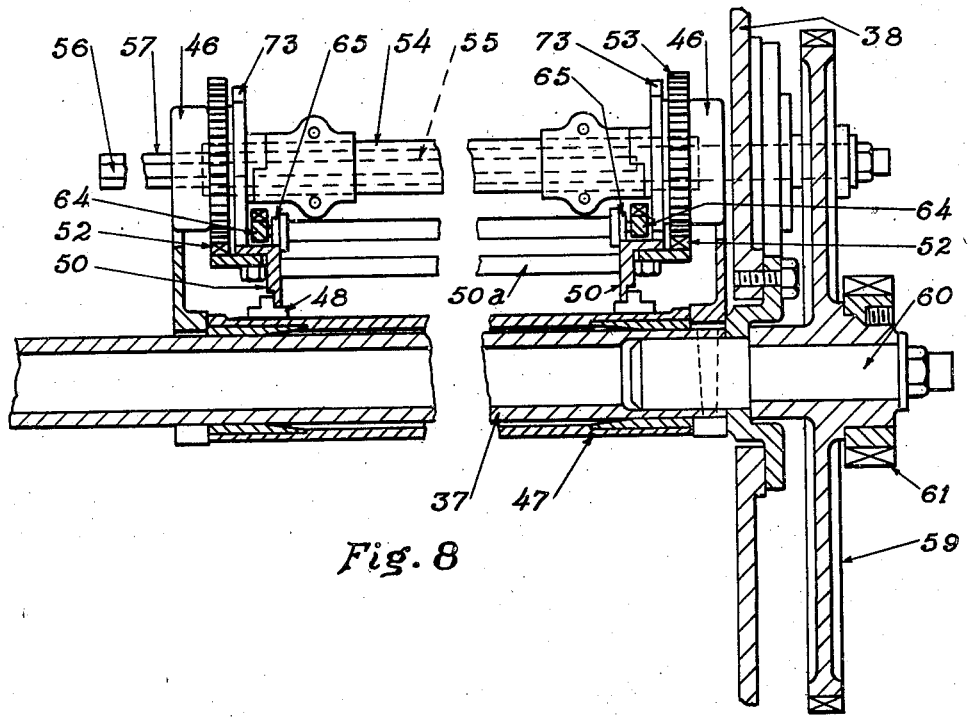
Figure 8 is a cross-sectional elevation on the line 8—8 of Figure 6.
Figure 9:
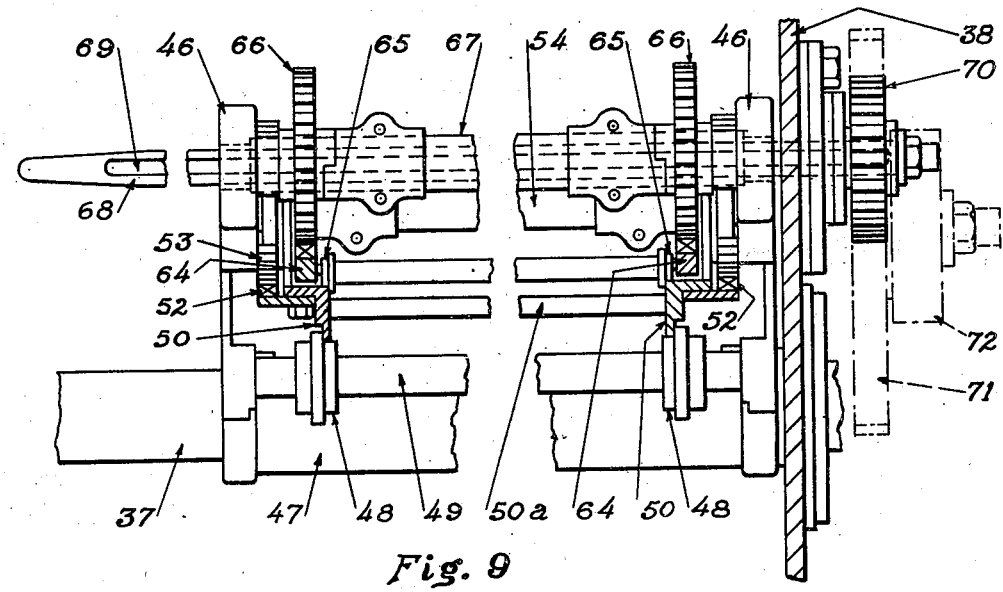
Figure 9 is a cross sectional elevation on the line 9—9 of Figure 6.

The web 62, Figure 6, is carried upon the shuttle frame, the ends being connected to bars 63 carried by a framework formed by a pair of rack bars 64 carrying rollers 65 which run upon the upper surface of the longitudinal members 50 of the shuttle frame as will be seen in Fig. 8. The rack bars 64 mesh with pinions 66, Figure 9, mounted upon a tubular shaft 67 enclosing a splined spindle 68, the shaft 67 being carried in bearings in the frame members 46. The shaft 67 is provided with a key engaging in a keyway 69 in the shaft 68.

The shaft 68 extends through the frame member 46 and also a bearing in the frame 38 of the machine and at its outer end is provided with a pinion 70 meshing with a gear wheel 71 on the hub of which a pinion 72 is provided adapted to be driven as hereinafter described.

The gear wheel 71 is mounted upon a stub spindle supported upon the frame 38 of the machine.

The pinion 72 imparts motion to the spindle 68 by which the pinions 66 are driven and thus produces longitudinal movement of the web frame formed by the rack 64 and bars 63, whereby movement of the web 62 relatively to the shuttle frame and panner blade 51 may be effected.

The shuttle frame is held down to the rollers 48 by guide rolls 73 on the tubular shaft 54 and also guide rolls 74 carried by a spindle 75 located in bearings in the side frames 46.

It will be appreciated that when the shuttle is moved laterally with respect to the machine so as to locate it beneath the cutter panner, the frame 46, 47 will slide upon the tubes 37 and the drive to the shuttle and its conveyer will be maintained by the engagement of the keys with the spindles 57 and 68.

Referring to Figure 6, the lateral movement of the shuttle is effected by linkage connected to the frame member 46 by a bolt passing through the aperture 76 in the boss 77. The linkage for producing the transverse movements is shown in Figure 5.

The shuttle A is connected by a link 78 to a lever 79 pivoted at 80 which lever is connected by a link 81 to a crank disk 82.

Similarly the shuttle B is connected by a link 83 to a lever 84 pivoted at 85 which is connected by a link 86 to a crank disc 87.

The drive and control of the crank discs 82 and 87 will be hereinafter described.

Referring to Figures 10 to 14, a cam drum 88 mounted upon the cam shaft 41 is provided with a series of cam grooves 89, 90, 91 and 92, the cams 89 and 90 controlling respectively longitudinal movements of the panning blades of the shuttles A, B, while the cam grooves 91 and 92 control respectively the drive to the shuttle webs of shuttles A and B.

Dealing first with shuttle A, a toothed quadrant 93, Figure 11, meshing with the pinion 61 and pivoted at 94 is provided with a bowl or roller 95 engaging in the cam groove 89. The bowl 95 is mounted in a block 96 carried in a slide on the quadrant and controlled by gearing 97, whereby the relative disposition of the bowl 95 with regard to the quadrant may be altered for adjustment of the panner blade 51.

Referring to Figure 11, a second pivoted toothed quadrant 98 gearing with the pinion 72 has a bowl 99 engaging in the cam groove 91 and is adapted to impart movement to the web of shuttle A.

It will be appreciated that as the cam drum rotates the quadrants 93 and 98 will be pivoted to rotate the gears 61 and 72 and thus impart a drive to the splined shafts 57 and 68, whereby the racks are reciprocated to produce the desired motion of the panner blade frame and the web.

The drive of the panner blade frame and the web of the shuttle B are effected similarly to shuttle A by means of toothed quadrants 100 and 101 respectively which are pivoted upon shafts extending across the machine.

The shaft 100a associated with the quadrant 100 is provided with a lever 102 carrying a bowl 103 engaging in the cam groove 90. The bowl 103 is mounted on the lever 102 in a similar manner to the toothed quadrant 93, whereby initial adjustment of the panner blade may be effected.

The shaft extending across the machine and associated with the toothed quadrant 101 is provided with a lever 104 having a bowl 105 engaging in the cam groove 92.

In order to take the thrust of the cams imparted to the quadrants 93 and 98 and the levers 102 and 105 the quadrants and levers are provided with guide rollers 106 which engage a stationary guide surface 107.

In Figure 10 a development of the four cams is shown.

One revolution of the drum 88 represents a complete cycle of operations as described with reference to the diagram, Figure 1.

The cams are divided into six portions $a$ to $f$ as indicated.

The cam drum rotates in the direction of the arrow shown in Figure 10.

Section $a$ of the cams controls the panning of biscuits from both shuttles A and B by producing a backward movement of both shuttle frames simultaneously with a forward movement of both shuttle webs.

Section $b$ of the cams produces a forward movement of the frame of shuttle panner A simultaneously with a backward movement of its web during which period the shuttle is moved under the cutter panner (see diagram $b$, Figure 1). At the same time the section $b$ of the cam drum produces a forward movement of the panner of shuttle B while the web thereof remains at rest.

Section $c$ of the cams causes a forward movement of the panner frames of shuttle A and also of its web during which period the shuttle receives a batch of biscuits. At the same time the frame of shuttle B moves forwardly while its web remains at rest.

Section $d$ of the cams produces a backward movement of the panner of shuttle A and its web during which time they are moved outwardly (see diagram $d$, Figure 1) into a position to pan onto the transfer web. At the same time the section $d$ will cause the panner and web of shuttle $b$ to move backwardly together while the shuttle is being moved laterally beneath the cutter panner.

Section $e$ of the cams maintains the frame of shuttle A and its web at rest while it causes the panner of shuttle B and its web to move forwardly together to receive a batch of biscuits.

Section $f$ of the cams maintains the panner frame and web of shuttle A at rest, and at the same time moves shuttle B panner and its web backwardly together into a position to pan the biscuits onto the transfer web.

The means for effecting the lateral movements of the shuttles A and B to bring them beneath the cutter panner will now be described with reference to Figures 5, 14 and 15.

Referring to Figure 15, the crank discs 82 and 87 are loosely mounted to rotate on vertical axes under the control of pawls 108 and 109. The pawls are carried upon arms 110, 111 mounted upon bevel pinions 112, 113 meshing with bevel wheels 114, 115 mounted on the cam shaft 41. The crank discs are provided with a depending flange 116 having diametrically disposed detents or recesses 117, 118, with which the pawls are adapted to engage.

The rate of rotation between the bevel gear and the pinions is such that for each revolution of the cam shaft 41 the pinions 112 and 113 are rotated three revolutions corresponding to a complete panning cycle onto the ovens.

The pawls 108 and 109 are so controlled that during a complete cycle the crank discs have imparted to them two half revolutions separated by a period of rest which will produce a movement to bring each shuttle beneath the cutter panner and back again to its position laterally thereof. Each pawl is controlled by a pivotally mounted latch device 119 under the control of a cam and also a fixed stop 120.

Each pawl 108, 109 is formed with a depending nose portion 121, Figure 16, and with a downwardly projecting tail portion 122, see Figure 17. The tail portion is provided with a surface 123 which is adapted to engage the stop 120 to withdraw the pawl from detent 117 or 118. At its other side the depending portion 122 is provided with a surface 124 adapted to engage a nose 125 on the latch 119 when the latter is in its down position, as indicated in the right hand part of Figure 14, whereas, when the latch is raised by cam means hereinafter described into a position as shown at the left hand side of Figure 14, no engagement of the face 124 with the latch occurs. The pawl is further provided with a curved wall 126 which is adapted to engage the inner face of the flange 116 when the pawl is pivoted to a position of non-engagement with the detent 117 or 118. The depending nose portion 121 of the pawl is adapted to engage a projecting part 127 of the latch 119 when the latter is raised to a position as indicated at the left of Figure 14 for the purpose of preventing the pawl engaging in the detent 117 or 118.

The cycle of operations for the right-hand crank disc 82 which controls the lateral movements of the shuttle A is as follows:

With the parts in the position shown in the Figure (which corresponds to the position Y marked in the diagram Figure 2) the pawl 108 is in engagement with the detent 117 and will rotate the crank disc half a revolution so as to move the shuttle A beneath the cutter panner. The pawl at the end of this half revolution engages the fixed stop 120 by the wall 123 and is drawn out of engagement from the detent 117. The pawl continues its movement (no drive of the crank taking place) and when approaching its original position as shown in Figure 14 the wall 124 engages the nose 125 of the latch 119 which is in its lowest position. This pivots the pawl 108 and causes engagement of the nose 126 with the detent 118. Continued movement of the pawl rotates the crank disc another half revolution to withdraw the shuttle A from beneath the cutter panner. At the end of this half revolution the pawl is again thrown out of engagement from the detent 118 by the fixed stop 120. The pawl then approaches its original position, as shown in the figure, but in the meantime the latch has been raised by cam means as hereinafter described so that no engagement between the wall 124 and the nose 125 is effected and further the nose 121 is prevented from engaging the detent 117 by the portion 127 of the latch. The pawl continues its movement for a complete revolution and comes back to its original position when the cycle is recommenced.

During the time that the disc is not under the control of the pawl, that is, when the latch is in the raised position a tooth 128 thereon engages in a recess 128a in the flange 116.

The movements of the latch 119 are controlled by a cam groove 129 which is formed in a disc 130 mounted upon the bevel wheel 114. The contour of the cam is shown in Figure 19 from which it will be noted that the latch is adapted to be raised by the portions 129a and 129b so as to engage the tooth 128 with the recess 128a in the flange at the times when the pawl is free, while the portions of the cam 129c and 129d hold the latch in the lower position to effect engagement of the pawl with the detent 117 or 118.

The latch 131 for controlling the movements of the left-hand crank disc 87 associated with the shuttle B is controlled by cam groove 132 similar in shape to the cam groove 129, but displaced relatively to the cam 129, as indicated in Figure 19.

The movements of the pawl 109 controlling the crank disc 87 associated with shuttle B may be followed from the diagram, Figure 3, representing the movements of the shuttle B. Thus, starting from the position Y in Figure 3 which corresponds to the pawl 109 being out of engagement with the detent of the crank disc 87, the pawl makes a complete revolution corresponding to the movements b, c shown in the diagram, and is then engaged (the latch being in its downward position) with the crank disc 87 so as to drive the crank disc and move the shuttle beneath the cutter panner. The pawl is then released from the crank disc by the fixed stop and then continues its movement until it arrives at its original position as shown in Figure 14 when it again engages the detent of the disc and again drives the disc withdrawing the shuttle B from beneath the cutter panner. The pawl is then withdrawn from the detent by the fixed stop and continues its movement still out of engagement to the position shown in the figure when the latch rises and prevents engagement, the parts now being in the position corresponding to Y in the diagram, Figure 3.

It will be appreciated that during its panning action the forward edge of the blade 33 of the cutter panner 32 will be at different heights depending upon whether it is panning to the shuttle panners or directly to the transfer conveyer.

In order to effect the necessary displacement of the blade the latter is pivoted on the reciprocating carriage or framework 34 of the cutter panner (see Figures 20 and 21). The blade is provided with wheels 131 adapted to rest upon adjustable trackways 132 which are pivoted to the frame of the machine at 133. By adjusting the trackways 132 the forward edge of the blade 33 will be adjusted to the desired position.

The trackways 132 have levers 134 connected to them and extending rearwardly of the pivot 133, said levers being connected by links 135 to a pivoted lever 136 at one side of the frame of the machine, and to an arm 137 at the other side, said arm and lever 136 being keyed to a rock shaft 138.

The free arm of the lever 136 has a flat surface 139 which is located above and engaged by gravity with an adjusting screw 140 carried by a bell crank lever 141 (see Figure 22). The other arm of the bell crank carries a roller 142 adapted to engage a rotary cam 143 which is adjustably mounted upon the cam shaft 41.

One revolution of the cam 143 corresponds to a complete cycle of operations and it is, therefore, divided into six parts corresponding to three forward and three rear strokes of the cutter panner.

While the portion $a^2$ is engaging with the roller 142 the cutter panner is panning onto the transfer web. The portion $b^2$, corresponding to the forward stroke of the cycle during which shuttle A will be moving inwardly, causes pivoting of the tracks 132 to produce a rise of the forward edge of the panner blade 33 to clear the shuttle and at the end of the section $b^2$ lowers the forward edge into the position to pan. The section $c^2$ corresponds to a back stroke of the cutter panner during which time the cutter pans onto shuttle A. Section $d^2$ moves the tracks 132 to cause a rise of the cutter panner during the first portion of its forward stroke so as to clear the biscuits panned onto shuttle A and to permit shuttle B to move into position. At the end of the section $d^2$ the cutter panner is lowered into position to pan onto shuttle B. Section $e^2$ of the cam 143 corresponds to a back stroke of the panner during which time it is panning onto shuttle B. Section $f^2$ of the cam 143 corresponding to a forward stroke of a cutter panner causes the panner first to rise to clear the biscuits on shuttle B and near the end of its forward stroke to be lowered into a position to pan on the transfer web.

The carriage 34 of the cutter panner is connected to the links 36 by sliding carriages 144 which are coupled to the frame 34 by screw adjusting means comprising a nut 145 connected to the frame 34 and a screwed rod 146 carried in the sliding carriage 144.

The screwed rods 146 are splined to reciprocate through pinions 147 whereby adjustment of the blade may be effected by means of the hand wheels 148 which drive screws (not shown) meshing with the pinions 147.

Referring now to Figures 4 and 23 to 26, the transfer conveyers 39 are driven from common driving rolls 150, 151 located transversely of the machine and extend backwardly over the terminal roller 152, Figure 4, and then pass forwardly over a panning knife 153 returning over guide roller 154 and roll 155 mounted in a reciprocating carriage 156. The conveyers then pass over a fixed guide roll 157 and back to the driving roll 150.

The panning blade 153 is mounted upon a carriage 158 which runs upon a platform or framing of the machine 159.

The carriage 158 is connected by coupling rods 160 to a lever 161 pivoted at 162. The carriage 158 is also connected by links 163 to the carriage 156, which latter runs in guideways 164.

The drive to the transfer webs is effected by means of a sprocket chain 165 from the driven sprocket 166 which is driven from the cam shaft 41 by the bevel gear 167. Referring to Figure 24, the chain passes around a sprocket 168 which drives a shaft 169 having a spur gear 170 meshing with a gear 171 on the driving roll 150. The driven roll 151 is geared to the driving roll 150 by gearing 172, 173.

Intermediate the sprockets 166 and 168 the chain is provided with two bights passing around sprockets 174, 175 mounted upon a reciprocating compensating carriage 176 guided in the guideway 177. Idle sprockets 178 and 179 are provided about which the chain passes to provide the bight engaging the sprocket 175. The idle sprocket is mounted upon a lever 178a so that adjustment of the tension of the chain may be effected.

As the compensating carriage 176 reciprocates the drive to the transfer conveyer will be increased above normal or retarded according to the direction of movement of the carriage. Thus, as the carriage 176 moves to the left (as shown in Figure 23) the mean speed of the conveyer will be decreased, whereas when the carriage moves to the right the mean speed will be increased.

The movements of the carriage 176 are controlled by a lever 180 which is linked to the carriage by links 181. The lever carries a bowl or roller 182, Figure 26, engaging a groove in a drum cam 183 mounted upon the shaft 41.

The point of connection between the lever 180 and links 181 is adjustable by means of a sliding block 184 to which the links are connected, which block is adjustable in the guideway 185 by means of the screw 186.

The lever 180 is coupled to the lever 161 by links 187, whereby the necessary panning movements are imparted to the panner blade 153 and also to the conveyer take up carriage 156.

The connection of the links 187 to the lever 161 is capable of adjustment by means of the screw gear 188 operated by the handle 189 carried by the lever 161.

The frame of the machine is provided with bearings 190 supporting the shaft 191 of the drum 192 associated with the oven bands 40.

It will be obvious that shuttle A or shuttle B may alone be used where it is desired to pan to two ovens, the driving means being suitably modified to the alteration in the relative speeds of the cutter panner and the ovens.

Figure 27:
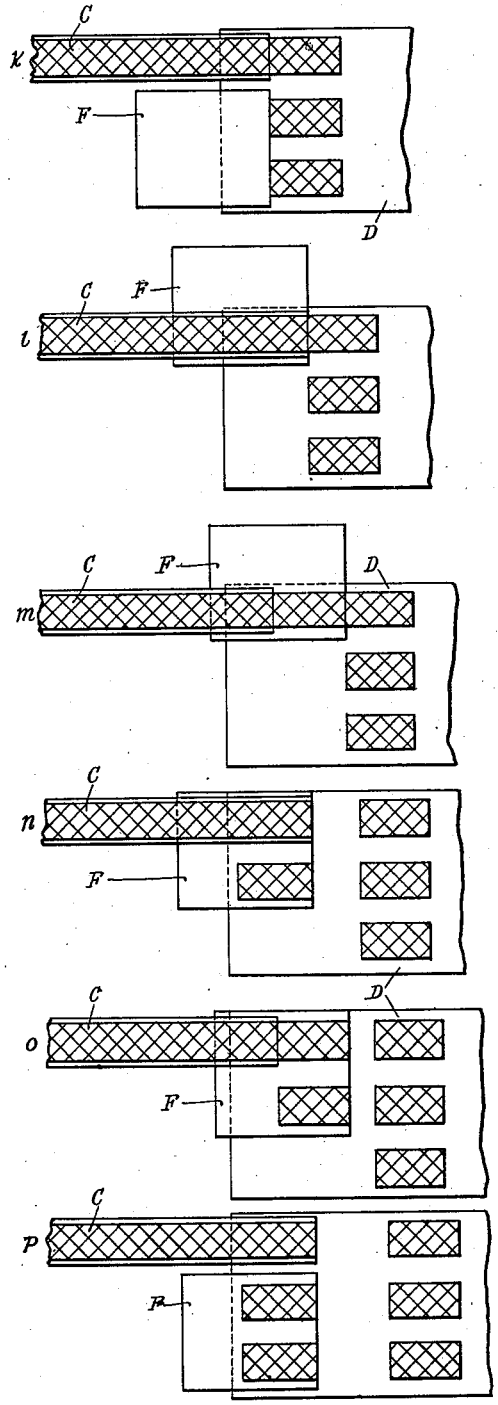
Figure 27 is a diagrammatic view showing a modified arrangement in which a single shuttle is provided and wherein the cutter panner supplies three oven bands.

In carrying the invention into effect according to a modified arrangement as shown diagrammatically in Figure 27 and in which the cutter panner is adapted to deliver to three ovens, a shuttle panner may be provided operating from one side of the cutter panner and adapted to receive two batches of biscuits side by side and then pan these batches simultaneously with a batch from the cutter panner onto the transfer or intermediate web. With this arrangement the shuttle panner F may be normally positioned on the right of the cutter panner C. This will be the position when the shuttle panner and cutter panner simultaneously deliver batches of biscuits to the transfer conveyer D (as shown in Diagram $k$).

During the next forward stroke of the cutter panner C the shuttle panner will move laterally beneath the cutter panner and also forwardly into a position to receive a right hand batch (as shown in Diagram $l$). During the panning stroke of the cutter conveyer the shuttle panner moves forwardly to receive the right hand batch (as shown in Diagram $m$). The shuttle panner with its right hand batch then moves rearwardly and to the right of the cutter panner to be in a position to receive a left hand batch of biscuits (as shown in Diagram $n$). A panning stroke of the cutter conveyer is then effected while the shuttle panner moves forwardly to receive the left hand batch (as shown in Diagram $o$). The shuttle panner then moves outwardly to the right of the cutter panner and rearwardly into a position to pan its two batches of biscuits onto the transfer conveyer simultaneously with the panning of a batch from the cutter panner C (as shown in Diagram $p$).

Figure 28:
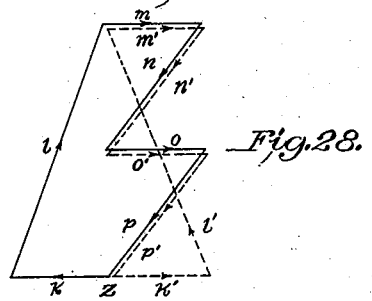
Figure 28 is a diagram showing the movements of the shuttle panner and conveyer web corresponding to Figure 27.

The movements of the frame of the shuttle panner and its web are indicated diagrammatically in Figure 28, the frame movements being indicated by full lines while the web movements are indicated by broken lines.

Thus starting from the point Z corresponding to the position of the parts when panning onto the transfer conveyer, the shuttle frame and panner blade move rearwardly while the web moves forwardly, as indicated respectively by $k$, $k'$. During the next sixth of the cycle the frame and blade move forwardly while the web moves rearwardly, at the same time the shuttle moves inwardly beneath the cutter panner to receive a right hand batch of biscuits. The frame and web then move together, as indicated by *m, m'* in a forward direction to receive the right hand batch of biscuits. The shuttle is then moved out a distance equal to half its transverse movement while the panner blade and web move rearwardly together, *n, n'*. The shuttle now receives the left hand batch, the web and blade moving forwardly, *o, o'*. The shuttle then moves laterally again to its full out position at the same time the panner blade and web move together rearwardly. This completes the cycle, the parts now being at the point Z for panning the batches simultaneously with a batch from the cutter panner.

The lateral movements of the shuttle F may be controlled by a single crank disc arrangement similar to that described in connection with Figures 15 and 16 except that the return movements *n* and *o* would be effected by two quarter turns of the crank instead of a half turn. This form of the invention may be utilized where it is desired to supply, for example, three ovens from the cutter panner.

Figure 29:
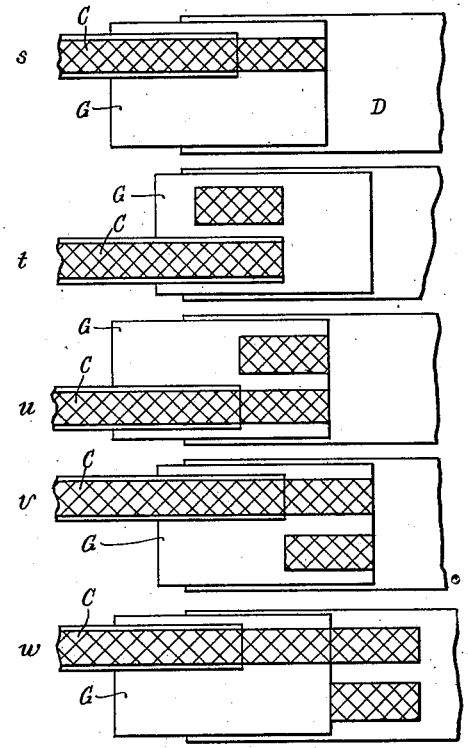

In the examples previously described the panner blades of the cutter panner and shuttle panners, while the shuttle is receiving a batch of biscuits from the cutter panner, move in opposite directions to one another so that the panning action for panning a batch of biscuits is effected partly by the cutter panner and partly by the shuttle panner. The invention may, however, be applied to a case where the panner blades of the cutter panner and shuttle panner move in the same direction, that is, they always move forwardly together and rearwardly together. Such a construction is illustrated diagrammatically in Figure 29, in which the cutter panner C is adapted to supply two ovens.

According to this arrangement the shuttle G receives a left hand batch of biscuits as indicated in diagram *s*, and then during the next forward stroke of the cutter panner the shuttle moves laterally into a position for receiving a right hand batch and at the same time the shuttle web moves rearwardly to align the forward edge of the left hand batch with the forward position of the cutter panner (as shown in Diagram *t*).

During the next forward stroke of the cutter panner the shuttle panner moves forwardly to receive a right hand batch of biscuits (as shown in Diagram *u*). The shuttle then moves laterally and also forwardly into a position to pan the two batches while the cutter panner is moving forwardly (see Diagram *v*).

During the next portion of the cycle (as shown in Diagram *w* which corresponds with Diagram *s*) the shuttle pans the two batches onto the transfer conveyer while at the same time a new left hand batch of biscuits is panned onto the shuttle by the cutter panner.

Figure 30:
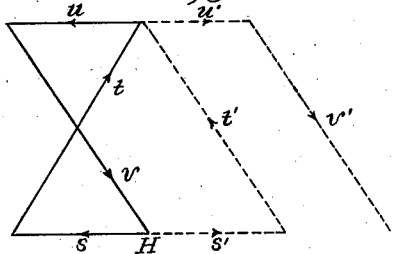
Figure 30 is a diagram illustrating the movements of the panner frame and web of the shuttle in Figure 29.

The movements of the shuttle web and panner are indicated in the diagram, Figure 30.

Starting from the point H, Figure 30 (corresponding to the position where the shuttle is about to pan onto the transfer web while at the same time receiving a further left hand batch from the cutter panner) the shuttle panner moves rearwardly while the web moves forwardly, *s, s'* respectively. The shuttle then moves laterally (to a position to receive a right hand batch) while its panning blade moves forwardly, *t* and its web moves rearwardly *t'*. The blade then moves rearwardly *u* while the web moves forwardly *u'* receiving the batch. The shuttle then moves across, the blade moving forwardly *v* while the web moves forwardly *v'* so that the shuttle is again in a position to pan.

It will be noted the diagram for the movements of the web—an open diagram as it will be appreciated—as above stated, that while the shuttle is panning two batches of biscuits it is also receiving a further batch on a fresh portion of its surface. Consequently the web in this case comprises a continuous conveying surface, fresh portions of which are constantly being presented for the batches of biscuits.

Having thus described my invention, what I claim and desire to secure by Letters Patent is:

1. In apparatus for feeding biscuits from a cutting machine conveyer to a plurality of ovens, means for assembling side by side batches of biscuits delivered by the cutting machine conveyer, transfer conveyer means located between the cutting machine conveyer and the ovens and means for driving said transfer conveyer means at differential rates corresponding to the rate of travel of the cutting machine conveyer at one time and at another with the rate of travel of the oven conveyers.

2. Apparatus for mechanically feeding biscuits from a cutting machine conveyer to a plurality of ovens comprising a pair of shuttle panners located on either side of the cutting machine conveyer, each of said shuttle panners including a conveyer band and driving means for said shuttle panners to move them alternately beneath said conveyer to receive a batch of biscuits, and cause them to deposit such batch onto a transfer conveyer simultaneously with a batch direct from the cutting machine conveyer.

3. Apparatus for mechanically feeding biscuits from a cutting machine output conveyer to a plurality of ovens, comprising a shuttle panner including a conveyer band and located laterally of said output conveyer and actuating means for said shuttle panner to move it beneath said conveyer to receive a batch of biscuits, to move it and the batch laterally of said output conveyer and operate the shuttle panner to deposit such batch onto a transfer conveyer simultaneously with a batch direct from the output conveyer.

4. Apparatus for mechanically feeding biscuits from a cutting machine output conveyer to a plurality of ovens comprising a shuttle panner including a conveyer band and located beneath said output conveyer and actuating means for said shuttle panner to move it laterally of said output conveyer to receive a pair of batches side by side, and operate the shuttle panner to deposit such batches onto a transfer conveyer while receiving a further batch from said output conveyer.

5. Apparatus for mechanically feeding biscuits from a cutting machine output conveyer to a plurality of ovens comprising a shuttle panner including a conveyer band and located at one side of the output conveyer and actuating means to move said shuttle panner beneath said output conveyer to receive side by side a plurality of batches of biscuits, and to operate the shuttle panner to deposit such batches onto a transfer conveyer simultaneously with and beside a third batch direct from the output conveyer.

6. In apparatus for feeding biscuits from a cutting machine conveyer to a plurality of ovens, shuttle conveying means for advancing a plurality of biscuit batches on parallel paths laterally offset from said conveyer, and means for feeding at the same time a fresh batch of biscuits from the cutting machine conveyer onto said shuttle conveying means in the rear of one of said batches thereon.

7. Apparatus for mechanically feeding biscuits from a cutting machine conveyer to a plurality of ovens, comprising means for receiving batches of biscuits from said conveyer, means for offsetting said receiving means laterally from the line of delivery of the cutting machine conveyer and means for advancing an offset batch abreast of and simultaneously with another batch from the cutting machine conveyer toward the ovens.

8. Apparatus for mechanically feeding biscuits from a cutting machine output conveyer to a plurality of oven conveyers traveling at a speed different from that of said cutting machine conveyer, comprising a shuttle panner adapted to be moved transversely of the cutting machine conveyer between a position under the conveyer for receiving batches of biscuits therefrom and a position laterally of the conveyer for panning the biscuits therefrom, mechanism for moving the shuttle panner transversely and for imparting panning action to it in timed relation to the travel of said cutting machine conveyer, and transfer conveying means positioned to receive batches of biscuits panned from said shuttle panner, and driving means adapted to operate said conveying means at a differential speed corresponding to the movement of the cutting machine conveyer at one time and the oven conveyers at another time.

9. Apparatus for mechanically feeding biscuits from a cutting machine conveyer to a plurality of ovens, comprising means for receiving batches of biscuits from said conveyer, means for giving the batch of biscuits on said receiving means a rearward travel after delivery from said cutting machine conveyer, means for offsetting said receiving means laterally from the line of delivery of the cutting machine conveyer, and means for advancing said offset batches abreast towards the ovens.

GEORGE RALPH BAKER.